United States Patent [19]

Katchman

[11] 3,960,808

[45] June 1, 1976

[54] POLYPHENYLENE ETHER COMPOSITION

[75] Inventor: Arthur Katchman, Delmar, N.Y.

[73] Assignee: General Electric Company, Pittsfield, Mass.

[22] Filed: Feb. 8, 1974

[21] Appl. No.: 440,727

[52] U.S. Cl. ........................ 260/42.18; 260/876 R; 260/876 B; 260/878 R; 260/887; 260/892; 260/4 AR
[51] Int. Cl.² .................... C08K 7/14; C08L 53/02
[58] Field of Search ................ 260/876 R, 887, 42, 260/42.26, 42.18, 4, 878

[56] References Cited
UNITED STATES PATENTS

| | | | |
|---|---|---|---|
| 3,356,761 | 12/1967 | Fox | 260/874 |
| 3,373,226 | 3/1968 | Gowan | 260/874 |
| 3,383,435 | 5/1968 | Cizek | 260/876 R |
| 3,476,589 | 11/1969 | Raphael | 260/47 ET |
| 3,660,531 | 5/1972 | Lauchlan et al. | 260/876 R |

*Primary Examiner*—Murray Tillman
*Assistant Examiner*—J. Ziegler
*Attorney, Agent, or Firm*—William F. Mufatti; Edward A. Hedman; James V. Costigan

[57] ABSTRACT

Polyphenylene ether compositions are disclosed which include a rubber-modified, high impact styrene resin and a homopolystyrene having a number average molecular weight between 30,000 and 60,000.

10 Claims, No Drawings

POLYPHENYLENE ETHER COMPOSITION

This invention provides a polyphenylene ether composition which includes a rubber-modified, high impact polystyrene and a homopolystyrene having a number average molecular weight between 30,000 and 60,000.

BACKGROUND OF THE INVENTION

The term "polyphenylene ether resin" includes a family of polymers well known to those skilled in the art, they are made by a variety of catalytic and noncatalytic processes from the corresponding phenols or reactive derviatives thereof. By way of illustration, certain of the following polyphenylene ethers are discussed in Hay, U.S. Pat. Nos. 3,306,874 and 3,306,875, and in Stamatoff, U.S. Pat. Nos. 3,257,357 and 3,257,358. Also, the Bennett and Cooper patents, U.S. Pat. Nos. 3,639,656, 3,642,699 and 3,661,848 describe processes for the preparation of polyphenylene ethers. In the Hay patents, the polyphenylene ethers are prepared by a oxidative coupling reaction comprising passing an oxygen-containing gas through a reacton solution of a phenol and a metal-amine complex catalyst. Other disclosures relating to processes using metal-amine catalysts are found in Bussink et al, U.S. Pat. No. 3,337,499; Blanchard et al, U.S. Pat. No. 3,219,626; Laakso et al, U.S. Pat. No. 3,342,892; Borman, U.S. Pat. No. 3,344,166; Hori et al, U.S. Pat. No. 3,384,619; Faurote et al, U.S. Pat. No. 3,440,217; and disclosures relating to metal based catalysts which do not include amines, are well known from patents such as Wieden et al, U.S. Pat. No. 3,442,885 (copper-amidines); Nakashio et al, U.S. Pat. No. 3,573,257 (metal-alcoholate or phenolate); Kobayashi et al, U.S. Pat. No. 3,455,880 (cobalt chelates); and the like. In the Stamatoff patents, the polyphenylene ethers are produced by reacting the corresponding phenolate ion with an initiator, such as a peroxy acid salt, an acid peroxide, a hypohalite, and the like, in the presence of a complexing agent. Disclosures relating to noncatalytic processes, such as oxidation with lead dioxide, silver oxide, etc., are described in Price et al, U.S. Pat. No. 3,382,212. All of the patents which are mentioned above are incorporated herein by reference.

The Cizek patent, U.S. Pat. No. 3,383,435 discloses compositions of polyphenylene ether resins and styrene resins. The thermoplastic composition disclosed by Cizek may include a rubber-modified styrene resin, as well as crystal polystyrene. In general, the particularly disclosed crystal polystyrene resins are of a relatively high molecular weight. The disclosure of the Cizek patent is hereby incorporated by reference.

It is now been found that when a thermoplastic molding composition is prepared from a polyphenylene ether resin and a rubber-modified, high impact styrene resin, it is possible to reduce the melt viscosity by adding a minor proportion of a homopolystyrene that has a number average molecular weight between 30,000 and 60,000.

The resulting product which is obtained according to this invention has an improved surface appearance in that the gloss is improved and the surface is substantially completely free of defects. Also, the addition of the lower molecular weight homopolystyrene while reducing the melt viscosity does not appreciably reduce the heat deflection temperature.

It is, therefore, a primary object of this invention to provide improved thermoplastic molding compositions which include polyphenylene ether resins and rubber-modified, high impact styrene resins.

Another object of this invention is to provide theromplastic molding compositions which have a reduced melt viscosity which facilitates the fabrication of molded articles having complex configurations and permits the use of a faster molding cycle.

Still another object of this invention is to provide thermoplastic molding compositions having an improved surface appearance. These and other objects of this invention will be readily apparent from a reading of the description of the invention.

DESCRIPTION OF THE INVENTION

The improved thermoplastic molding compositions of this invention comprise a polyphenylene ether resin, a rubber-modified, high impact styrene resin and a homopolystyrene having a number average molecular weight between 30,000 and 60,000.

The preferred polyphenylene ether resins are of the formula:

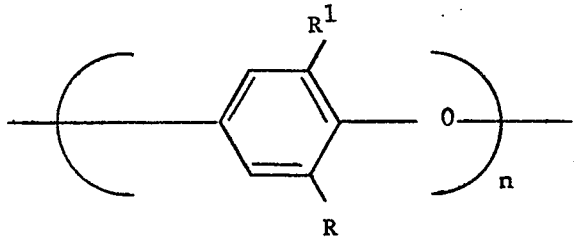

wherein R and $R^1$ are monovalent substituents selected from the group consisting of hydrogen, halogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus, said radicals being free of a tertiary alpha-carbon atom, and n is a whole integer of at least 50.

The particular rubber-modified, high impact styrene resin is not critical to the practice of the invention. Preferred materials include those having at least 25%, by weight, polymer units that are derived from a monomer having the formula:

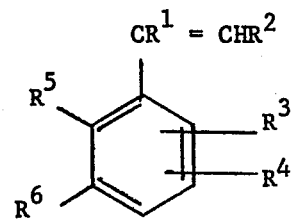

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbons or $R^5$ and $R^6$ may be concatenated together with hydrocarbyl groups to form a naphthyl group.

The proportions of the components of the composition may vary, although it is preferred to employ from about 20–80 parts by weight of the polyphenylene ether resin component and from 80–20 parts by weight of the rubber-modified, high impact styrene resin and from 5–25 parts by weight of low molecular weight homopolystyrene having a number average molecular weight between 30,000 and 60,000, preferably 45,000 to 55,000. Also the intrinsic viscosity of the low molecular weight polystyrene should be between 0.25 and 0.45 as measured in toluene at 25°C.

The preferred polyphenylene ether resin component is poly-(2,6-dimethyl-1,4-phenylene) ether and the preferred rubber-modified, high impact styrene resin is polystyrene which has been modified with natural and synthetic rubber, such as polybutadiene, polyisoprene, rubbery copolymers of dienes with other comonomers, such as styrene, acrylonitrile, acrylic esters, and the like, including block copolymers of the A-B-A and A-B type wherein A is a vinyl aromatic, such as styrene and B is a diene, such as butadiene, as well as EPDM rubbers, and the like. Preferably the polystyrene is modified with a butadiene rubber.

The compositions of the invention may also include reinforcing fillers, such as aluminum, iron or nickel, and the like, and non-metals, such as carbon filaments, silicates, such as acicular calcium silicate, asbestos, titanium dioxide, potassium titanate and titanate whiskers, glass flakes and fibers. It is also to be understood that, unless the filler adds to the strength and stiffness of the composition, it is only a filler and not a reinforcing filler, as contemplated herein. In particular, the reinforcing fillers increase the flexural strength, the flexural modulus, the tensile strength and the heat distortion temperature.

Although it is only necessary to have at least a reinforcing amount of the reinforcement present, in general, the combination of components (a) and (b) will comprise from about 10 to about 90 parts by weight and the filler will comprise from about 10 to about 90 parts by weight of the total composition.

In particular, the preferred reinforcing fillers are of glass and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.000112 to 0.00075 inch, but this is not critical to the present invention.

In general, best properties will be obtained if the sized filamentous glass reinforcement comprises from about 1 to about 80% by weight based on the combined weight of glass and polymers and preferably from about 10 to about 50% by weight. Especially preferably the glass will comprise from about 10 to about 40% by weight based on the combined weight of glass and resin. Generally, for direct molding use, up to about 60% of glass can be present without causing flow problems. However, it it useful also to prepare the compositions containing substantially greater quantities, e.g., up to 70–80% by weight of glass. These concentrates can then be custom blended with blends of resins that are not glass reinforced to provide any desired glass content of a lower value.

The length of the glass filaments and whether or not they are bundled into fibers and the fibers bundled in turn to yarns, ropes or rovings, or woven into mats, and the like, are also not critical to the invention. However, in preparing the present compositions, it is convenient to use the filamentous glass in the form of chopped strands of from about ⅛ inch to about 1 inch long, preferably less than ¼ inch long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005 inch and 0.125 (⅛ inch).

It is a preferred feature of this invention also to provide flame retardant thermoplastic compositions, as defined above by modifying the composition to include a flame-retardant additive in a minor proportion but in an amount at least sufficient to render the composition non-burning or selfextinguishing.

Particular flame retardants which may be used are well known and are described in the literature.

The compositions may be prepared by tumbling the components, extruding the mixed powders into a continuous strand, chopping the strands into pellets and thereafter molding the pellets into the desired shape. These techniques are well known to those skilled in this art and are not a critical feature of the invention.

The low molecular weight homopolystyrene may be prepared by techniques that are well known to those skilled in this art. These materials are commercially available or may be prepared as discussed in McCormick et al, J. Polym. Sci. 39, pp. 87–100 (1959) or Szwarc et al, J.A.C.S. 78, 2656 (1956) both of which are hereby incorporated by reference.

DESCRIPTION OF THE PREFERRED EMBODIMENTS

The following examples illustrate the processes of this invention. They are merely illustrative and are not to be construed as limitations on the present invention.

EXAMPLE I

A blend of 60 parts by weight of poly-(2,6-dimethyl-1,4-phenylene) ether, prepared by the procedure of the Hay patents and having an intrinsic viscosity of 0.53 deciliters/gram, measured in chloroform at 30°C, with 40 parts by weight of high-impact rubber modified polystyrene (10% by weight poly-butadiene) and 10 parts by weight of homopolystyrene (having a number average molecular weight of between 30,000 and 60,000) is prepared by blending the powders in a Henschel blender, extruding the blended powders and chopping the extruded strands into pellets. The pellets are then molded into test specimens on a Newbury molding machine.

COMPARATIVE EXAMPLE A

The following composition was prepared according to the procedure set forth in Example I.

| | Parts by weight |
|---|---|
| poly-(2,6-dimethyl-1,4-phenylene) ether* | 40 |
| rubber-modified, high-impact styrene resin** | 60 |
| triphenyl phosphate flame retardant | 6 |

Test specimens of this composition were found to have the following physical characteristics:

| | |
|---|---|
| Melt viscosity-poise (1500 sec$^{-1}$, 540°F) | 2000 |
| Notched Izod Impact | 4.3 |
| HDT, °F | 220 |

*PPO, General Electric Company.
**Foster Grant 834 high impact polystyrene (8% polybutadiene in the form of a polystyrene grafted dispersion of elastomeric particles).

EXAMPLE II

The following composition was prepared according to the procedure set forth in Example I.

| | |
|---|---|
| poly-(2,6-dimethyl-1,4-phenylene) ether (as used in Example II) | 40 |
| rubber-modified, high-impact styrene resin (as used in Example II) | 45 |
| homopolystyrene*** (having a number average molecular weight of about 50,000 | 15 |
| triphenylphosphate | 6 |

Test specimens of this composition were found to have the following physical characteristics:

| | |
|---|---|
| Melt viscosity-poise (1500 sec$^{-1}$, 540°F) | 1450 |
| Notched Izod Impact | 4.0 |
| HDT, °F | 224 |

***KPTL-5 crystal styrene, Sinclair Koppers Co.

COMPARATIVE EXAMPLE A AND EXAMPLE II

By comparing the data of Comparative Example A and Example II, it can be readily appreciated that the substitution of low molecular weight homopolystyrene for a portion of the high-impact rubber modified styrene resin reduces the melt viscosity of the resulting composition without descreasing the heat distortion temperature.

Obviously, other modifications and variations of the present invention are possible in the light of the above teachings. It is, therefore, to be understood that changes may be made in the particular embodiments of the invention described which are within the full intended scope of the invention as defined by the appended claims.

I claim:

1. A thermoplastic composition which comprises a poly-phenylene ether resin, a rubber modified, high impact styrene resin and a homopolystyrene having a number average molecular weight between 30,000 and 60,000.

2. A composition as defined in claim 1 wherein the polyphenylene ether resin is of the formula

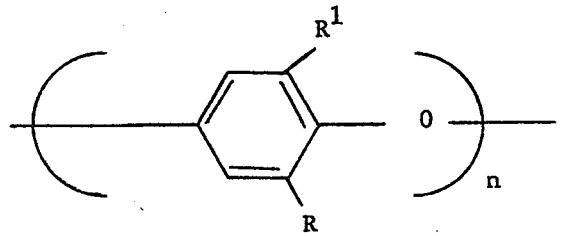

wherein R and R$^1$ are monovalent substituents selected from the group consisting of hydrogen, halogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus, said radicals being free of a tertiary alpha-carbon atom, and n is a whole integer of at least 50.

3. A composition as defined in claim 1 wherein the rubber modified high impact styrene resin is one having at least 25%, by weight, polymer units derived from a monomer having the formula

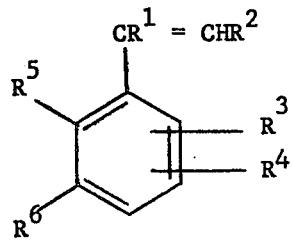

wherein R$^1$ and R$^2$ are selected from the group consisting of lower alkyl or alkenyl groups of from 1 to 6 carbon atoms and hydrogen; R$^3$ and R$^4$ are selected from the group consisting of chloro, bromo, hydrogen and lower alkyl of from 1 to 6 carbon atoms; R$^5$ and R$^6$ are selected from the group consisting of hydrogen and lower alkyl and alkenyl groups of from 1 to 6 carbons or R$^5$ and R$^6$ may be concatenated together with hydrocarbyl groups to form a naphthyl group.

4. A composition as defined in claim 1 wherein said thermoplastic resin composition contains from about 20 to 80 parts by weight of said polyphenylene ether resin, from 80 to 20 parts by weight of said rubber modified, high impact poly-styrene and from 5 to 25 parts by weight of said homopolystyrene having a number average molecular weight between 30,000 and 60,000.

5. A composition as defined in claim 1 wherein said composition includes a reinforcing amount of a reinforcing filler.

6. A composition as defined in claim 1 wherein the polyphenylene ether is poly-(2,6-dimethyl-1,4-phenylene) ether.

7. A thermoplastic composition which consists essentially of poly-(2,6-dimethyl-1,4-phenylene ether, a polybutadiene modified, high impact styrene resin and a melt viscosity reducing amount of homopolystyrene having a number average molecular weight between 30,000 and 60,000.

8. A composition as defined in claim 7 wherein the homopolystyrene has a number average molecular weight between 45,000 and 55,000.

9. A composition as defined in claim 1 wherein said composition includes from 1 to 80% by weight of a filamentous glass filler.

10. A thermoplastic composition which comprises from about 20 to 80 parts by weight of a poly(2,6-dimethyl-1,4-phenylene ether) resin, from 80 to 20 parts by weight of a rubber modified, high-impact polystyrene and from 5 to 25 parts by weight of a homopolystyrene having a number average molecular weight between 30,000 and 60,000.

* * * * *